No. 669,225. Patented Mar. 5, 1901.
A. SIEBERT.
SYSTEM OF REFRIGERATION.
(Application filed Aug. 29, 1900.)
(No Model.) 3 Sheets—Sheet 1.
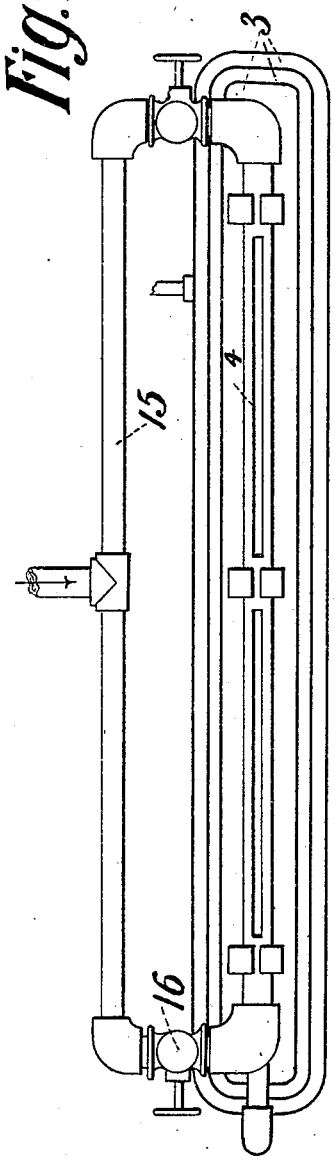
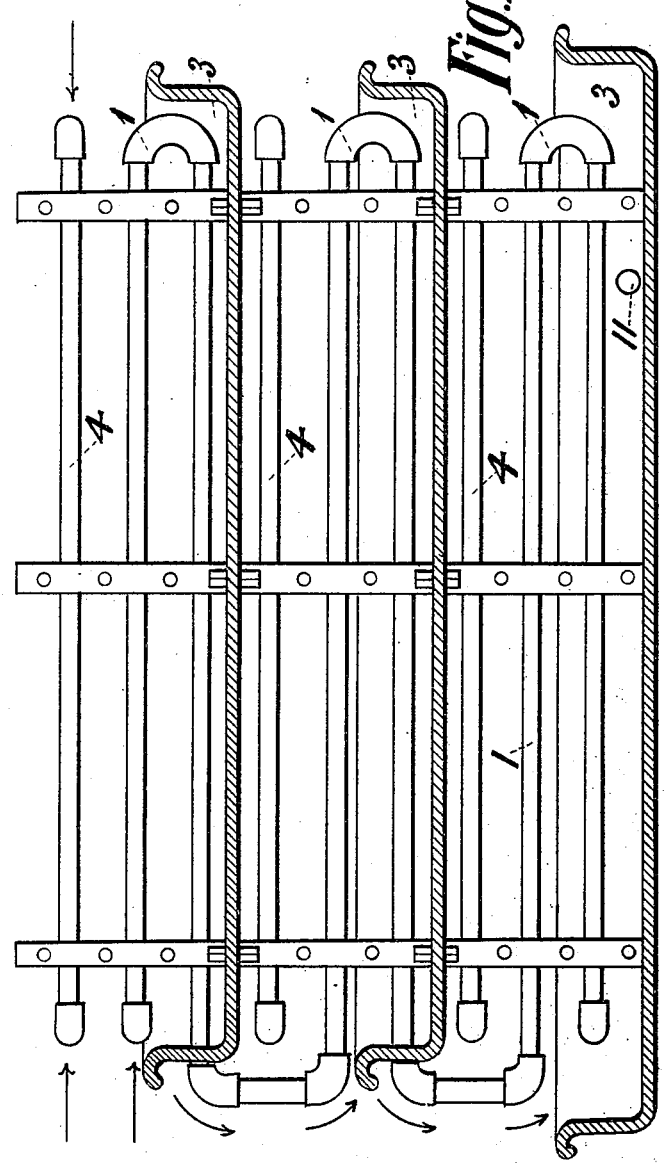
WITNESSES:
INVENTOR
Alfred Siebert
BY
ATTORNEYS

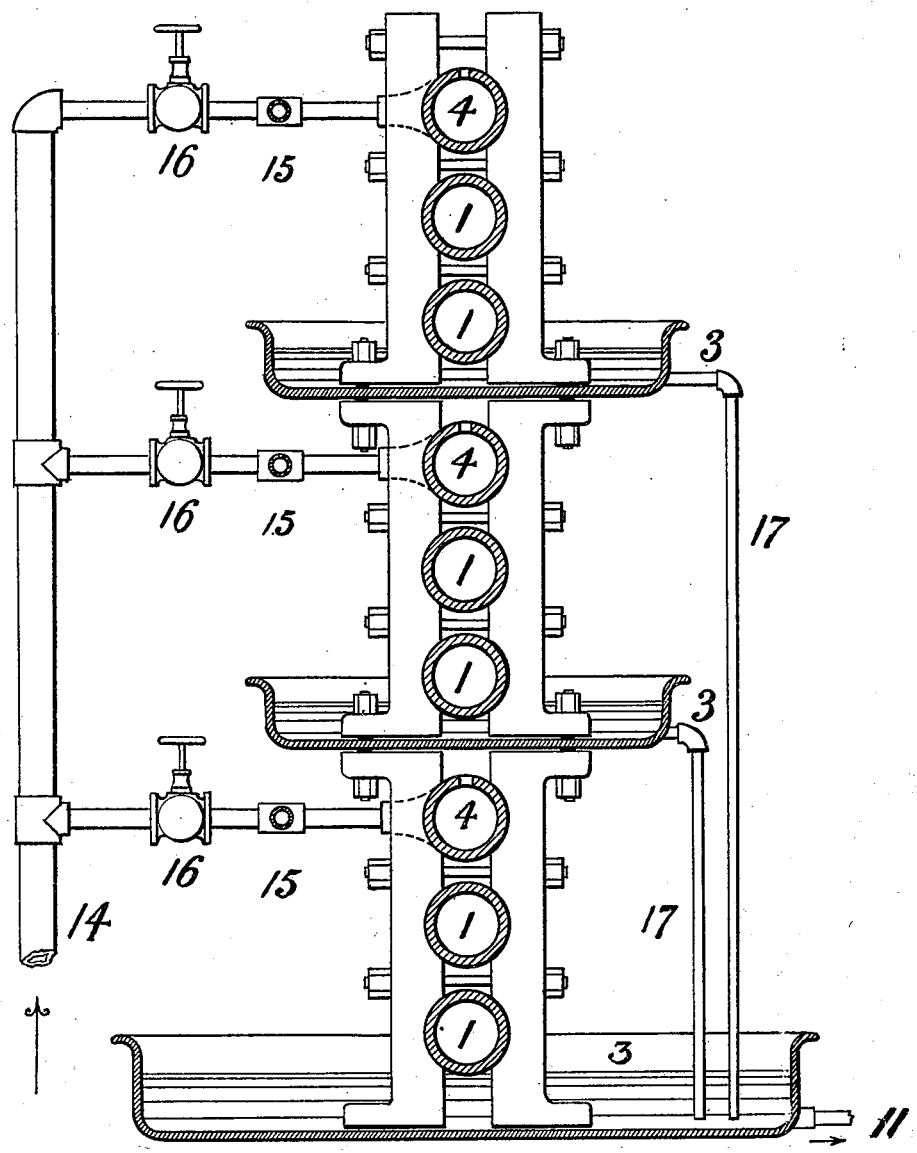

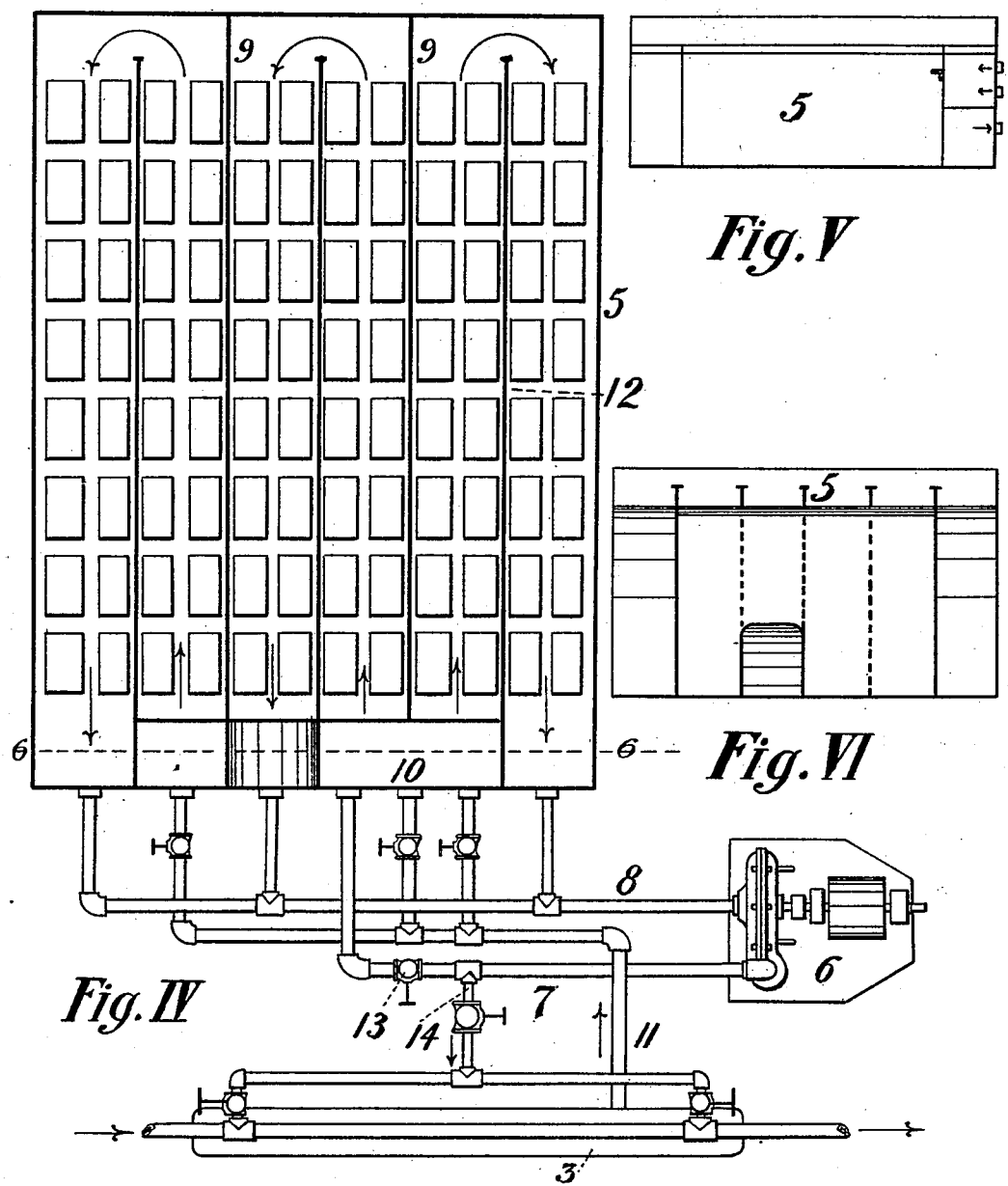

UNITED STATES PATENT OFFICE.

ALFRED SIEBERT, OF ST. LOUIS, MISSOURI.

SYSTEM OF REFRIGERATION.

SPECIFICATION forming part of Letters Patent No. 669,225, dated March 5, 1901.

Application filed August 29, 1900. Serial No. 28,381. (No model.)

*To all whom it may concern:*

Be it known that I, ALFRED SIEBERT, a citizen of the United States, and a resident of the city of St. Louis, in the State of Missouri, have invented certain new and useful Improvements in Systems of Refrigeration, of which the following is a specification.

My invention relates to refrigeration, and has for its principal object to increase the efficiency and economy of the refrigerating plant.

To this end it consists in causing the main mass of brine to circulate with great rapidity and in injecting into the main mass of brine a comparatively small percentage of brine cooled to a considerable degree below the temperature required of the main mass.

It also consists in circulating the smaller mass of brine over the ammonia-coils by gravity in separate streams, each of which plays over a separate portion of the ammonia-coil.

It also consists in divers other improvements, hereinafter described and claimed.

In the accompanying drawings, which form part of this specification, and wherein like symbols refer to like parts wherever they occur, Figure I is a plan view of the brine-cooler. Fig. II is a longitudinal sectional view of the brine-cooler. Fig. III is a cross-sectional view of the brine-cooler. Fig. IV is a plan of the entire system. Fig. V is a side view of the freezing-tank. Fig. VI is a cross-section of the freezing-tank and header on the line 6 6 of Fig. IV.

In economical practice the difference in temperature between the brine and the water to be cooled or frozen thereby should not exceed a few degrees. For this reason it is uneconomical to cool the brine, which absorbs the heat from the water, more than a few degrees below the freezing-point of water. On the other hand the efficiency of refrigeration is a function of the rate of circulation of the brine. Heretofore the entire mass of brine has been cooled by coils located in the freezing-tank itself, also the entire mass of brine has been cooled in coolers of various kinds and circulated from the cooler through the freezing-tank and back to the brine-cooler.
In the present invention instead of circulating the whole mass of brine through the cooler a comparatively small proportion thereof is cooled to a low temperature and injected into the main mass of brine in a header or mixing-tank, where it mixes with and cools the brine in said header, and the brine thus cooled is circulated through the freezing-tank. A portion of the brine after leaving the freezing-tank is conducted to the cooler; but the principal mass is returned directly to the header.

In carrying out this invention the ammonia or heat-absorbing coil 1, having its pipes arranged horizontally in a vertical plane, is connected with the compression side of a refrigerating-machine of any suitable kind. Underneath every group of one or more pipes of the ammonia-coil is arranged a horizontal pan or tray 3. Above the top pipe of each of said groups and in the same plane therewith is a horizontal gutter or pipe 4, slotted or perforated lengthwise on top. Each of these slotted pipes and its corresponding pan are arranged in the brine-circulating system, whereby each group of pipes of the ammonia-coil constitutes a separate brine-cooler.

The brine-circulating system comprises a freezing-tank 5, a brine-circulating pump 6, and inlet and outlet pipes 7 and 8, connecting said freezing-tank with said pump. The freezing-tank is preferably divided into longitudinal sections by means of vertical partitions 9 in order to secure a better circulation of the brine. At the inlet end of said tank is a manifold or header 10, which communicates with the several sections of the tank. The main inlet-pipe 7, leading from the pump, opens into this header, and a pipe 11, leading from the pans of the brine-cooler, likewise opens into said header, whereby said header constitutes a mixing-chamber for continuously mixing the cold brine with the main mass of brine, and thereby cooling said main mass. It is desirable to divide each of the sections of the freezing-tank by means of a partition 12, extending from the admission end thereof nearly to the opposite end, and to have the outlet-pipe 8 arranged near the admission end.

In order to regulate the flow of brine, it is desirable to provide a valve 13 in the inlet-pipe 7. A branch pipe 14 leads from the main inlet-pipe between the pump and said valve and communicates with the several gutters or slotted pipes of the brine-cooler. This pipe 14 or the branch pipes 15, leading from it to said gutters or slotted pipes, are each provided with a valve 16 for regulating the flow of brine therethrough. Each of the pans has an outlet-pipe 17, which may communicate directly with the header or mixing-chamber of the freezing-tank. It is preferable, however, to have the outlet-pipes from all but the lowermost pans empty into the lowermost pan and to have the pipe leading from said lowermost pan directly to the mixing-chamber.

The operation of my device is as follows: Ammonia flows through the ammonia-coils as in ordinary ammonia-coolers. The pump forces the brine into circulation. The principal part of said brine passes directly into the header, while a portion passes over the brine-coolers and drips into the several pans and runs thence into said header, where it mixes with and cools the principal mass there in circulation. Thence the cooled mass passes into the several sections of the freezing-tank over the top of the cross-partition at the end of the respective sections therein and back to the outlet-pipe, whence it passes to the pump and is again forced through the main inlet and brine-coolers back to the freezing-tank. The proportion of brine passing over the coolers is regulated by means of the several valves in the main inlet-pipe and the branch pipes leading to the coolers.

The principal advantages of my construction are that it admits of the use of a gravity cooler—that is, a cooler wherein the brine is cooled by dripping over the ammonia-coils. It also admits of a very rapid circulation of the entire mass of brine without requiring the entire mass to be passed over the coolers. Thus my invention dispenses with a large proportion of the coils heretofore necessary in a gravity cooler and also avoids the expensive arrangements necessary in other types of coolers. My invention secures the double advantage of the economical working of the refrigerating-machine and a small first cost of the plant.

It is obvious that my brine-cooler is adapted for use in other systems than that shown. For instance, the cold brine may be conducted directly through refrigerating-coils instead of being mixed with warmer brine, and this direct use is best for cooling rooms. It is also obvious that my cooler may be used for cooling air as well as for cooling brine, and that the air thus cooled may be mixed with warmer air, and the entire mass of air thus cooled may be circulated the same as in the brine-circulating system. I do not therefore desire to limit myself to a brine-circulating system, as my invention covers, broadly, the cooling of a small proportion of heat-absorbing medium considerably and then mixing such cold portion with the main mass of heat-absorbing medium whether it is air or brine or other medium.

What I claim is—

1. A system of refrigeration comprising a freezing-tank, a mixing-chamber communicating therewith, a pump, a supply-pipe connecting said pump to said mixing-chamber, an outlet-pipe connecting said tank to said pump, and a brine-cooler consisting of a continuous heat-absorbing coil having its pipes arranged horizontally in a vertical plane and connected to a refrigerating-machine, said coil being separated into groups of a small number of pipes each, a gutter above the upper pipe of each group connected to the brine-supply pipe, and a pan below the lowest pipe of each group connected to the mixing-chamber, substantially as described.

2. A system of refrigeration comprising a freezing-tank, a mixing-chamber communicating therewith, a pump, a supply-pipe connecting said pump to said mixing-chamber, an outlet-pipe connecting said tank to said pump, and a brine-cooler consisting of a continuous heat-absorbing coil having its pipes arranged horizontally in a vertical plane and connected to a refrigerating-machine, said coil being separated into groups of a small number of pipes each, a gutter above the upper side of each group connected to the brine-supply pipe, and a pan below the lowest pipe of each group connected to the mixing-chamber, and one or more valves in said supply-pipe or its branches for regulating the flow of brine to said cooler, substantially as described.

3. A system of refrigeration comprising a freezing-tank having longitudinal partitions therein for dividing it into separate compartments, a longitudinal partition in each compartment extending from one end to near the other end of said compartment, a mixing-chamber at said first-mentioned end and communicating with each of said compartments, a pump, and pipes connecting said pump to said mixing-chamber and to the several compartments respectively, and a brine-cooler connected to the brine-supply pipe and to said mixing-chamber, substantially as described.

ALFRED SIEBERT.

Witnesses:
HENRY A. KERSTING,
JAMES A. CAIRN.